United States Patent
Herceg et al.

(10) Patent No.: US 11,578,642 B1
(45) Date of Patent: Feb. 14, 2023

(54) THERMOSTAT LEAK DETECTION

(71) Applicant: Garrett Transportation I Inc., Torrance, CA (US)

(72) Inventors: Martin Herceg, Bratislava (SK); Lubomir Baramov, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/395,135

(22) Filed: Aug. 5, 2021

(51) Int. Cl.
  *F01P 7/16*    (2006.01)
  *F01P 11/16*   (2006.01)
  *G06N 7/08*    (2006.01)

(52) U.S. Cl.
  CPC ........... *F01P 7/16* (2013.01); *F01P 11/16* (2013.01); *G06N 7/08* (2013.01); *F01P 2023/00* (2013.01); *F01P 2025/30* (2013.01); *F01P 2037/00* (2013.01)

(58) Field of Classification Search
  CPC ........ F01P 11/16; F01P 11/14; F01P 2031/00; F01P 2031/32; F01P 2031/20; F01P 7/12; F01P 7/16
  See application file for complete search history.

(56) References Cited

U.S. PATENT DOCUMENTS

| | | | |
|---|---|---|---|
| 6,386,022 B1 | 5/2002 | Oka et al. | |
| 10,494,984 B2 | 12/2019 | Bonkoski et al. | |
| 11,325,461 B2* | 5/2022 | Furuta | G01K 3/005 |
| 2001/0005807 A1* | 6/2001 | Kitajima | F02N 11/0803 701/112 |
| 2004/0262411 A1* | 12/2004 | Tsukamoto | F01P 11/16 236/94 |
| 2005/0155561 A1 | 7/2005 | Atkins | |
| 2006/0005790 A1 | 1/2006 | Braun et al. | |
| 2007/0261648 A1 | 11/2007 | Reckels et al. | |
| 2008/0300774 A1* | 12/2008 | Wakahara | F02N 19/10 701/113 |
| 2012/0106590 A1* | 5/2012 | Suzuki | F01P 11/16 374/1 |

(Continued)

FOREIGN PATENT DOCUMENTS

| EP | 2690267 A3 | 4/2017 |
|---|---|---|
| WO | 2003102394 A1 | 12/2003 |

OTHER PUBLICATIONS

Partial European Search Report for EP 22173202.7 dated Nov. 17, 2022, 14 pages.

*Primary Examiner* — Long T Tran
(74) *Attorney, Agent, or Firm* — Seager, Tufte & Wickhem LLP

(57) ABSTRACT

Models that employ both measurable engine parameters as well as predictable engine parameters may be used to determine when a thermostat is malfunctioning before the thermostat malfunction results in an engine breakdown. Particular models may be used to provide an estimated coolant temperature and an estimated thermostat position. The estimated coolant temperature can be compared to an actual measured engine coolant temperature. The estimated thermostat position can be evaluated with respect to what the thermostat position should be given a particular engine coolant temperature. In some cases, comparison between a healthy model and a faulty model may be used to ascertain thermostat health.

13 Claims, 10 Drawing Sheets

(56) References Cited

U.S. PATENT DOCUMENTS

| | | | |
|---|---|---|---|
| 2014/0023107 A1* | 1/2014 | Furuta | F01P 11/16 |
| | | | 374/4 |
| 2017/0227421 A1* | 8/2017 | Kuhara | G01M 15/048 |
| 2017/0268410 A1* | 9/2017 | Kuhara | F01P 7/16 |
| 2017/0350303 A1 | 12/2017 | Duan et al. | |
| 2020/0300156 A1* | 9/2020 | Muto | F02D 41/1405 |

* cited by examiner

THERMOSTAT LEAK DETECTION

FIELD

The invention pertains generally to controllers and more particularly to controllers that are configured to detect thermostat faults.

BACKGROUND

A variety of internal combustion engines employ cooling systems in which a liquid engine coolant is pumped under pressure through the engine and a corresponding radiator in order to remove excess heat from the engine and keep the engine within a normal operating temperature range. Many such cooling systems employ a fan that can be turned on and off as appropriate in order to better control how much heat is being removed from the engine coolant flowing through the radiator. Cooling systems may employ a thermostat in order to control when engine coolant flows through the radiator and when engine coolant does not flow through the radiator. When an engine is below its normal operating temperature range, such as during a cold start, the thermostat may remain closed in order to allow the engine to warm up and more quickly reach its normal operating temperature range. As the engine coolant temperature approaches its normal operating temperature range, the thermostat will start to open, thereby allowing coolant flow through the radiator to enable cooling the engine.

Many thermostats are mechanical devices that can get stuck at an inappropriate thermostat position, particularly as thermostats age and/or become corroded. A thermostat that is stuck in an open or partially open position when coolant temperatures would otherwise indicate that the thermostat should be fully closed will cause the engine to run cooler than its normal operating temperature range. This can cause the engine to run inefficiently, burning more fuel, which results in additional pollutants, plug fouling and the like. Accordingly, there is a desire for the engine to reach its normal operating temperature as quickly as possible. A thermostat that is stuck in a closed or partially closed position can easily cause the engine to overheat as coolant evaporates. If carried to an extreme, overheating can also cause substantial engine damage and may cause a driver and/or passengers to become stranded.

Accordingly, there is a desire for methods and systems for determining when a thermostat is not working properly and to achieve early warning of possible problems.

OVERVIEW

The present inventors have recognized, among other things, that a problem to be solved is the need for new and/or alternative approaches to determining if/when a thermostat is not working properly as part of an engine cooling system. The present inventors have determined that particular models that employ both measurable engine parameters as well as predictable engine parameters may be used to determine when a thermostat is malfunctioning before the thermostat malfunction results in an engine breakdown. The present inventors have determined that particular models may be used to provide an estimated coolant temperature and an estimated thermostat position. The estimated coolant temperature can be compared to an actual measured engine coolant temperature to diagnose whether there is a malfunction. Subsequently, based on this comparison, the thermostat position can be estimated and assessed to determine whether there is a risk of the thermostat being stuck at a position.

In an example, a cooling system controller is configured to monitor performance of a cooling system that is configured to circulate engine coolant through an engine, the cooling system including a thermostat that controls engine coolant flow through a radiator. The controller includes an input port configured to receive an engine coolant temperature signal representative of an engine coolant temperature from an engine coolant temperature sensor and a controller that is operably coupled to the input port. The controller is configured to periodically execute a closed-loop healthy model, the closed-loop healthy model periodically outputting a healthy case thermostat position estimate and to periodically execute a closed-loop faulty model, the closed-loop faulty model periodically outputting a faulty case thermostat position estimate. The controller is configured to perform a statistical analysis on the periodically outputted healthy case thermostat position estimates and the faulty case thermostat position estimates in order to ascertain whether the thermostat is functioning appropriately and to output a warning signal when the thermostat is not functioning appropriately. An output port is operably coupled to the controller and is configured to provide the warning signal to an engine management system.

Alternatively or additionally, the closed-loop healthy model may include utilizing an Extended Kalman Filter (EKF) to estimate the healthy estimated thermostat position.

Alternatively or additionally, the closed-loop healthy model may further include utilizing an Extended Kalman Filter (EKF) to estimate a healthy estimated engine coolant temperature.

Alternatively or additionally, the closed-loop faulty model may include utilizing an Extended Kalman Filter (EKF) to estimate the faulty estimated thermostat position.

Alternatively or additionally, the closed-loop faulty model may further include utilizing an Extended Kalman Filter (EKF) to estimate a faulty estimated engine coolant temperature.

Alternatively or additionally, the controller may be further configured to utilize a comparison between the healthy estimated engine coolant temperature and the faulty estimated engine coolant temperature as a further indication of whether the thermostat is functioning appropriately.

Alternatively or additionally, the thermostat may be configured to remain fully closed when the engine coolant temperature is below a first coolant temperature, be fully open when the engine coolant temperature is above a second coolant temperature and be partially open when the engine coolant temperature is between the first coolant temperature and the second coolant temperature. The controller may be further configured to confirm that the healthy estimated thermostat position corresponds to fully closed when the engine coolant temperature is below the first coolant temperature, to confirm that the healthy estimated thermostat position corresponds to fully open when the engine coolant temperature is above the second coolant temperature, to confirm that the healthy estimated thermostat position corresponds to a position between fully closed and fully open when the engine coolant temperature is between the first coolant temperature and the second coolant temperature and to output a warning signal when the healthy estimated thermostat position does not correspond to what the thermostat position should be given the engine coolant temperature.

Alternatively or additionally, the first coolant temperature and the second coolant temperature may be selectable based on specific engine requirements.

Alternatively or additionally, the first coolant temperature may range from about 82 degrees C. to about 91 degrees C. and the second coolant temperature may range from about 93 degrees C. to about 103 degrees C.

Alternatively or additionally, the controller may be further configured, prior to issuing the warning signal, to ascertain whether a cumulative mass coolant flow rate through the radiator exceeds a threshold, and if so, to turn on the warning flag.

In another example, a method of monitoring performance of a thermostat within an engine cooling system is provided. The engine cooling system includes a radiator and a coolant pump circulating coolant and the thermostat controls flow of coolant through the radiator. The method includes receiving an engine coolant temperature signal from an engine coolant temperature sensor, supplying the engine coolant temperature signal to an Extended Kalman Filter (EKF), the EKF estimating an estimated engine coolant temperature and an estimated thermostat position and comparing the estimated engine coolant temperature with an actual engine coolant temperature as indicated by the engine coolant temperature signal. When the estimated engine coolant temperature is within a temperature range centered on the actual engine coolant temperature, a determination is made that the thermostat position is appropriate. When the estimated engine coolant temperature is outside a temperature range centered on the actual engine coolant temperature, a determination is made that the thermostat position is not appropriate.

Alternatively or additionally, when the estimated engine coolant temperature is below the temperature range centered on the actual engine coolant temperature, a determination may be made that the thermostat is stuck open and a warning flag is turned on.

Alternatively or additionally, when the estimated engine coolant temperature is above the temperature range centered on the actual engine coolant temperature, a determination may be made that the thermostat is stuck closed and a warning flag is turned on.

Alternatively or additionally, the method may further include comparing the estimated thermostat position with what an actual thermostat position should be based on the actual engine coolant temperature, and turning on the warning flag when there is a discrepancy between the estimated thermostat position and the actual thermostat position.

In another example, an engine management system is configured to control operation of an engine, the engine including a cooling system having a radiator, a cooling fan and a thermostat that controls flow of engine coolant to the radiator, the thermostat adjustable between a fully closed position and a fully open position. The engine management system includes an engine coolant temperature sensor arranged upstream of the thermostat and a controller that is operably coupled with the engine coolant temperature sensor. The controller is configured to receive one or more model inputs including data related to operation of the engine, and calculate an estimated engine coolant temperature, to receive an engine coolant temperature signal from the engine coolant temperature sensor, to analyze the engine coolant temperature signal and the estimated engine coolant temperature to determine whether a thermostat fault is present and responsive to presence of the thermostat fault, issue a warning signal.

Alternatively or additionally, the controller may be configured to determine that a thermostat fault is present when the estimated engine coolant temperature varies by more than 10 degrees C. from an actual engine coolant temperature as indicated by the engine coolant temperature signal.

Alternatively or additionally, the controller may be configured to determine that a thermostat fault is present when the estimated engine coolant temperature varies by more than 20 degrees C. from an actual engine coolant temperature as indicated by the engine coolant temperature signal.

Alternatively or additionally, the one or more model inputs may include a mass flow rate of coolant through the engine.

Alternatively or additionally, the mass flow rate of coolant through the engine may be estimated using a rotational speed of a coolant pump circulating coolant through the engine and an estimated thermostat position.

Alternatively or additionally, the engine management system may further include using a reference model and the one or more model inputs to calculate the estimated engine coolant temperature.

This overview is intended to provide an introduction to the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
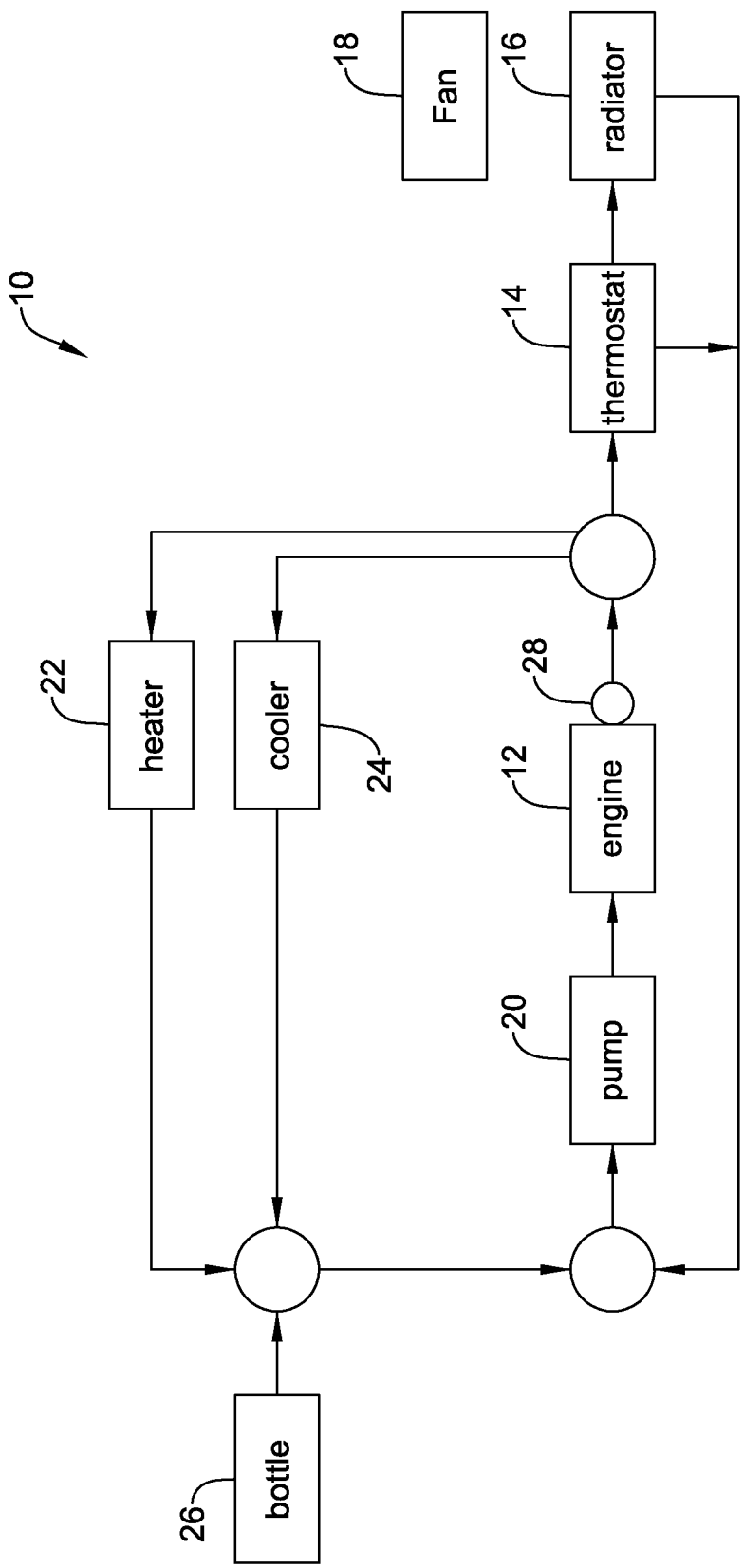
FIG. 1 is a schematic block diagram of an engine cooling system.

FIG. 1 is a schematic block diagram showing an engine cooling system 10 for an engine 12. While the engine cooling system 10 is described with respect to an internal combustion engine such as a gasoline-fueled engine or a diesel engine, this is merely illustrative. The engine cooling system 10 may be used for cooling non-combustion engines such as an electric motor, a fuel cell, or a hydrogen-powered engine. The engine 12 (and hence the engine cooling system 10) may be installed within any of a variety of different types of vehicles, such as but not limited to passenger vehicles, light duty pickup trucks, heavy duty pickup trucks, over the road trucks, construction vehicles and the like. The lines included in the schematic block diagram show possible coolant paths. When a thermostat 14 is open or partially open, meaning that the thermostat 14 permits at least some engine coolant to flow through the thermostat 14, the engine coolant passing through the thermostat 14 passes to and through a radiator 16 where the engine coolant gives up heat as the engine coolant flows through the radiator 16.

In many cases, the radiator 16 is positioned within the vehicle such that air passes through the radiator 16 as a result of the vehicle moving. The cooling system 10 may include a fan 18 that can be turned on or off to increase air flow through the radiator 16 and thus increase heat transfer from the engine coolant as desired. The fan 18 may be an electronic fan, for example, and may include one larger fan or two relatively smaller fans. In some older vehicles, the fan 18 may have a thermostatically controlled clutch and thus be belt driven off the engine 12. Engine coolant passing through the radiator 16 will then revert back to a pump 20. The pump 20 may be belt driven off the engine 12.

When the thermostat 14 is fully closed, meaning that no engine coolant is permitted to pass through the thermostat 14 and reach the radiator 16, the engine coolant will revert back to the pump 20. In some cases, at least some of the engine coolant circulating through the engine cooling system 10 may be used to heat a passenger space of the vehicle. The engine coolant may pass through a heater 22, sometimes referred to as a heater core. The heater 22 is essentially another radiator. Hot engine coolant passes through the heater 22 and gives up heat to air being blown through the heater 22. In this case, however, the air being blown through the heater 22 is being driven by an electrical fan that is used to blow the air through the heater 22 and through a duct system into the passenger space in order to heat the passenger space. In some cases, at least some engine coolant may pass through a cooler 24 which can be used for heat dissipation from engine oil, transmission fluid or exhaust gases. In some cases, the cooler 24 may be an oil cooler, a transmission cooler, a high pressure or low pressure EGR cooler or an exhaust intercooler.

The engine cooling system 10 includes a bottle 26, which may also be referred to in some cases as a coolant recovery tank or a coolant expansion tank. It will be appreciated that engine coolant, which is generally a mix of propylene glycol and water, and minor amounts of various additives, will expand as it becomes hot. The bottle 26 provides a place for the expanded engine coolant to flow into. Because the engine cooling system 10 is pressurized, at least in part in order to increase the effective boiling point of the engine coolant, excess engine coolant may flow into the bottle 26 as the engine coolant heats up and subsequently as the engine coolant cools down, engine coolant may be drawn out of the bottle 26 and back into circulation.

An engine coolant temperature sensor 28 is shown adjacent the engine 12. In some cases, there may be more than one engine coolant temperature sensor 28, and the one or more engine coolant temperature sensor(s) 28 may be located in other positions. In some cases, placing the engine coolant temperature sensor 28 adjacent to where the engine coolant exits the engine block provides the most accurate indication of engine coolant temperatures and thus the actual temperature of the engine block itself. The engine coolant temperature sensor 28 may output an engine coolant temperature signal that is representative of the engine coolant temperature. The engine coolant temperature signal may be provided to a cooling system controller, as shown for example in FIG. 2, as an Extended Kalman Filter needs an observable condition as an input.

Figure 2:
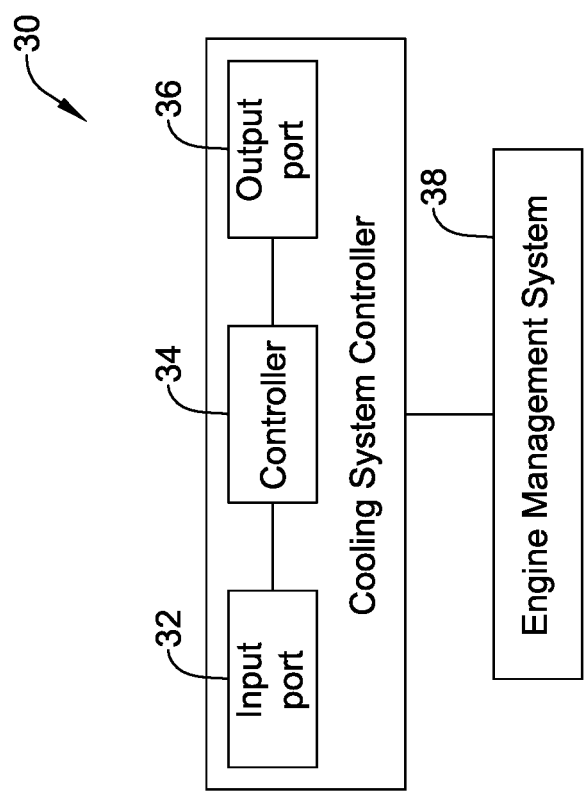
FIG. 2 is a schematic block diagram of an engine control system.

FIG. 2 is a schematic block diagram of an illustrative cooling system controller 30. The cooling system controller 30 may be configured to monitor performance of a cooling system such as the cooling system 10. The cooling system controller 30 includes an input port 32 that is configured to receive an engine coolant temperature signal representative of an engine cooling temperature from an engine coolant temperature sensor such as the engine coolant temperature sensor 28. The input port 32 may represent a logical input. The input port 32 may represent a wiring terminal or terminals configured to receive one or more wires carrying the engine coolant temperature signal. The input port 32 may be configured to receive a variety of different signals from a variety of different sensors, for example.

A controller 34 is operably coupled to the input port 32. An output port 36 is operably coupled to the controller 34 and is configured to provide a warning signal to an engine management system 38. In some instances, the cooling system controller 30 may be a standalone controller that is distinct from the engine management system 38. In some cases, the cooling system controller 30 may be incorporated into the engine management system 38. The engine management system 38 may represent a collection of control systems that regulate operation of various systems within a vehicle in which the engine management system 38 is installed. The engine management system 38 may represent a compilation of both hardware and software, for example. The controller 34 may be configured to carry out a number of steps in monitoring thermostat performance. Some of these steps are outlined in FIG. 3.

Figure 3:
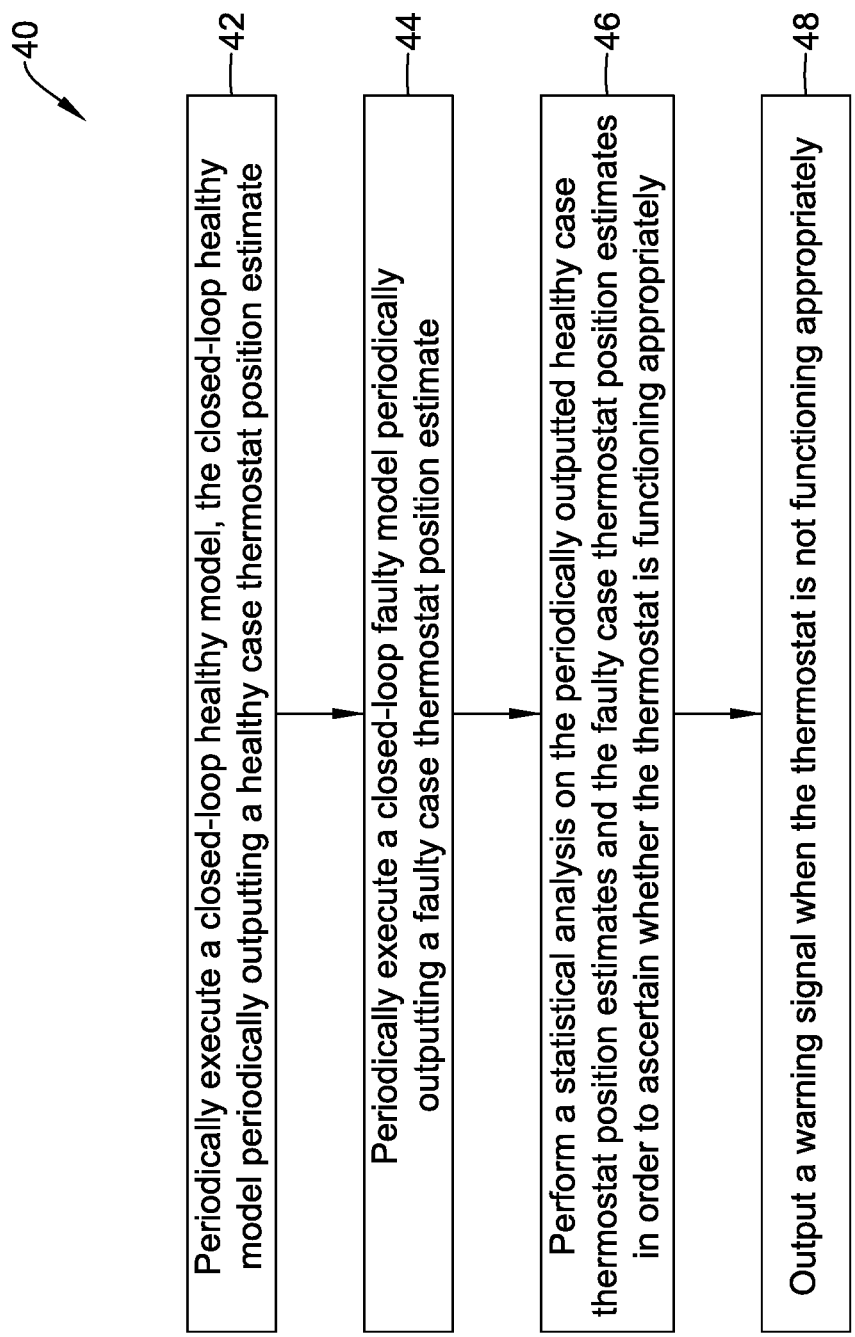
FIG. 3 is a flow diagram showing steps that may be carried out by a cooling system controller.

FIG. 3 is a flow diagram showing an illustrative series 40 of steps that the controller 34 may be configured to carry out. The controller 34 may be configured to periodically execute a closed-loop healthy model, the closed-loop healthy model periodically outputting a healthy case thermostat position estimate, as indicated at block 42. The controller 34 may be configured to periodically execute a closed-loop faulty model, the closed-loop faulty model periodically outputting a faulty case thermostat position estimate, as indicated at block 44. The controller 34 may be configured to perform a statistical analysis on the periodically outputted healthy case thermostat position estimates and the faulty case thermostat position estimates in order to ascertain whether the thermostat is functioning appropriately, as indicated at block 46. The controller 34 may be configured to output a warning signal when the thermostat is not functioning appropriately, as indicated at block 48.

In some instances, the closed-loop healthy model includes utilizing an Extended Kalman Filter (EKF) to estimate the healthy estimated thermostat position. The closed-loop healthy model may further include utilizing the Extended Kalman Filter (EKF) to estimate a healthy estimated engine coolant temperature. In some instances, the closed-loop faulty model may include utilizing an Extended Kalman Filter (EKF) to estimate the faulty estimated thermostat position. The closed-loop faulty model may further include utilizing the Extended Kalman Filter (EKF) to estimate a faulty estimated engine coolant temperature. In some instances, the controller 34 may be further configured to utilize a comparison between the healthy estimated engine coolant temperature and the faulty estimated engine coolant temperature as a further indication of whether the thermostat is functioning appropriately.

Figure 4:
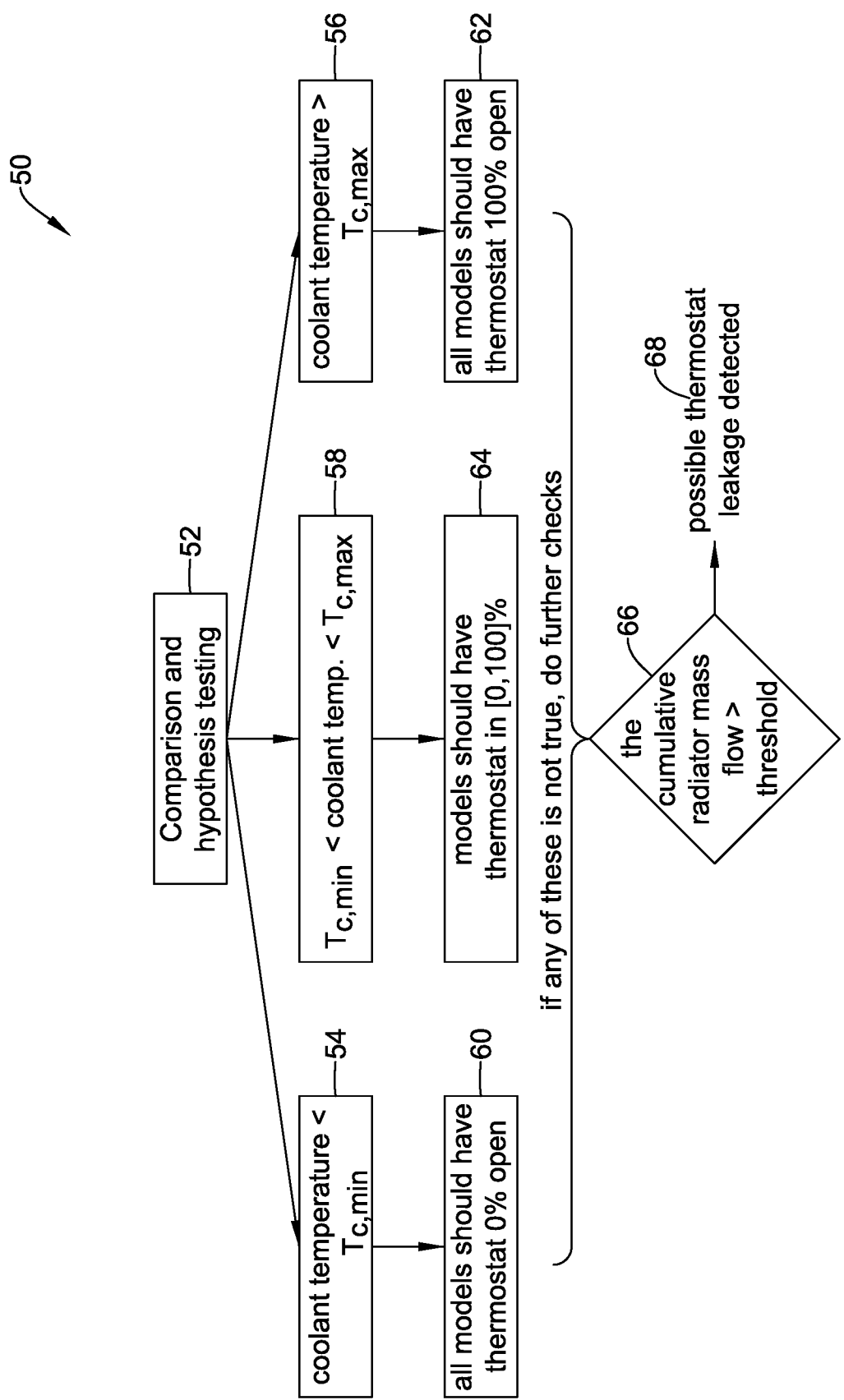
FIG. 4 is a schematic view of a model for predicting a thermostat fault.

With reference to FIG. 4, the controller 34 may be configured to execute comparison and hypothesis testing. It will be appreciated that a thermostat such as the thermostat 14 may be configured to remain fully closed when the engine coolant temperature is below a first coolant temperature, which can be identified as $T_{c,min}$ and to be fully open when the engine coolant temperature is above a second coolant temperature, which can be identified as $T_{c,max}$. The thermostat may be configured to be partially open (at a position between fully closed and fully open) when the engine coolant temperature is between the first coolant temperature $T_{c,min}$ and the second coolant temperature $T_{c,max}$. In some cases, the first coolant temperature and the second coolant temperature are selectable based on thermostat characteristics and the particular type of thermostat that the engine 12 has. As an example, the first coolant temperature may range from about 82 degrees C. to about 91 degrees C. and the second coolant temperature may range from about 93 degrees C. to about 103 degrees C.

FIG. 4 provides an example 50 of how the controller 34 may ascertain whether the thermostat is functioning properly. The controller 34 may compare and test hypothesis, as indicated at block 52. In some case, the engine coolant temperature may be below $T_{c,min}$, as indicated at block 54. In some cases, the engine coolant temperature may be above $T_{c,max}$, as indicated at block 56. In some cases, the engine coolant temperature may be between $T_{c,min}$ and $T_{c,max}$, as indicated at block 58. If the engine coolant temperature is below $T_{c,min}$, as indicated at block 54, then all models including the closed-loop healthy model and the closed-loop faulty model should all indicate that the thermostat is fully closed, as indicated at block 60. If the engine coolant temperature is above $T_{c,max}$, as indicated at block 56, then all models should indicate that the thermostat is fully open, as indicated at block 62. If the engine coolant temperature is between $T_{c,min}$ and $T_{c,max}$, as indicated at block 58, then all of the models should indicate that the thermostat position is somewhere between fully closed and fully open, as indicated at block 64. If any of these are not true, the controller 34 may perform further checks, such as but not limited to determining whether the cumulative radiator mass flow rate is above a threshold, as indicated at block 66. If so, the controller 34 may determine that the thermostat is not functioning correctly, as indicated at block 68.

Figure 10:
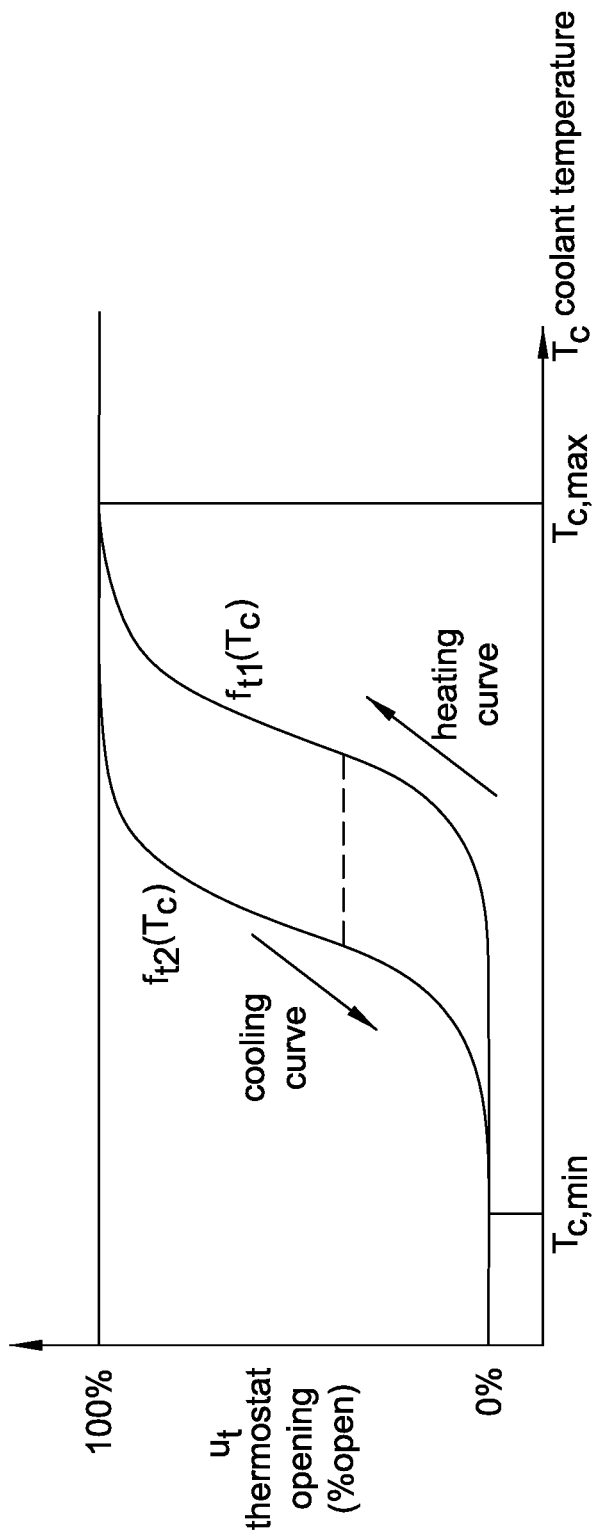
FIG. 10 is a graphical representation of heating and cooling curves.

With brief reference to FIG. 10, it will be appreciated that a thermostat position $u_t$ is a dynamic model that can be described with the help of a heating curve $f_{t1}(T_c)$ and a cooling curve $f_{t2}(T_c)$ where $T_c$ denotes the coolant temperature. Hysteresis may be defined as follows:

$$T_{sat}(k)=\min(T_{c,max},\max(T_{c,min},T_c(k))), \text{ in the interval}$$
$$T_c \in [T_{c,min}, T_{c,max}].$$

The hysteresis model of a thermostat opening $u_t$ may be given as a min-max operator over hysteresis curves $f_{t1}(T_c)$ and $f_{t2}(T_c)$ and past thermostat opening $U_T(k-1)$ as the following:

$$u_t(k)=\max\{f_{t1}(T_{sat}(k)),\min(f_{t1}(T_{sat}(k)),u_t(k-1))\}.$$

A temperature control model 1 can be created. Assuming, for simplicity, a sampling rate of 1 per second, the combustion dynamic model may be given by two difference equations that abstract the heat transfer from the generated heat to the coolant and to the ambient. The coolant temperature at the engine outlet may be given by the following:

$$C_1(T_{c,EngOut}(k+1)-T_{c,EngOut}(k))=\dot{Q}_{Comb}(k)-\dot{m}_{c,eng}(k)$$
$$C_{p,c}(T_{c,EngOut}(k)-T_{c,EngIn}(k))-k_{A,c}(T_{c,EngOut}(k)-T_{amb}(k)),$$

where $C_1$ and $k_{A,c}$ are heat transfer parameters determined experimentally, $\dot{m}_{c,eng}$ is coolant mass flow through the engine, $T_{c,EngIn}$ and $T_{c,EngOut}$ are coolant temperatures at the engine inlet and the engine outlet, respectively, $T_{amb}$ is a measured ambient temperature, and $\dot{Q}_{Comb}$ is a combustion heat generated by the engine.

A temperature control model 2 can be created. According to cooling system configuration, the coolant temperature at the engine inlet is given by flow mixing of radiator coolant flow $\dot{m}_{c,rad}$ with temperature $T_{c,Radout}$ with the coolant flow $\dot{m}_{c,m}$ and temperature $T_{c,m}$. This can be seen below:

$$\dot{m}_{c,Eng}(k)T_{c,EngIn}(k)=\dot{m}_{c,Rad}(k)T_{c,RadOut}(k)+\dot{m}_{c,m}(k)T_{c,m}(k).$$

Inserting inside the combustion difference equation yields the following first order model:

$$T_{c,EngOut}(k+1) =$$
$$\left(1+\frac{1}{C_1}\dot{m}_{c,eng}(k)c_{p,c}-\frac{1}{C_1}k_{A,c}\right)T_{c,EngOut}(k)+\left(\frac{1}{C_1}c_{p,c}T_{c,RadOut}(k)\right)\dot{m}_{c,Rad}(k)+$$
$$\frac{1}{c_1}\dot{Q}_{Comb}(k)-\frac{1}{c_1}c_{p,c}\dot{m}_{c,m}(k)T_{c,m}(k)+\frac{1}{c_1}k_{A,c}T_{amb}(k).$$

It will be appreciated that the radiator coolant flow $\dot{m}_{c,rad}$, the engine coolant flow $\dot{m}_{c,eng}$ and other flows through the cooler, heater $\dot{m}_{c,m}$ depend on the thermostat position $u_t$ and revolutions of the pump $N_{pump}$. Temperatures at the component outlets $T_{c,Radout}$ and $T_{c,m}$ can be modeled based on the engine data and with the help of physical-based models. Other inputs such as combustion heat $\dot{Q}_{Comb}$ can be determined from engine data.

Figure 5:
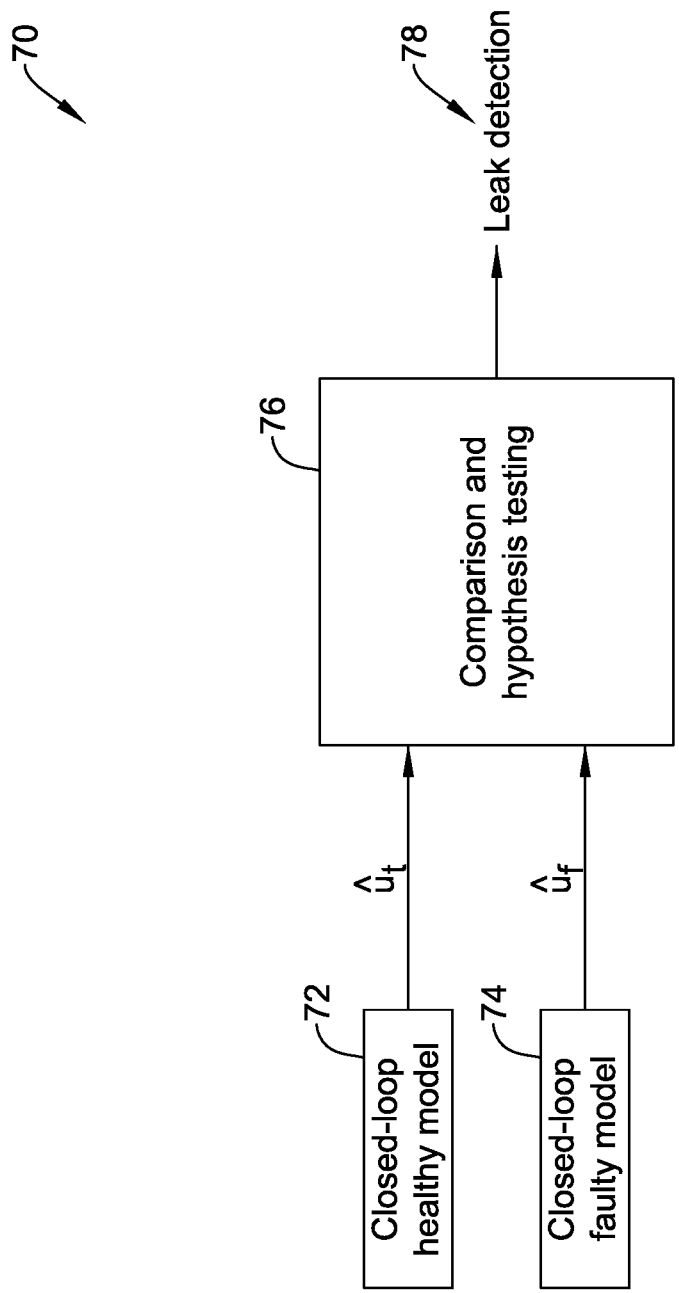
FIG. 5 is a schematic view of a model for predicting a thermostat fault.

FIG. 5 is a schematic block diagram of a method 70 for predicting a thermostat fault. In the method 70, the controller 34 executes a closed-loop healthy model 72 as well as a closed-loop faulty model 74. The closed-loop healthy model 72 and the closed-loop faulty model 74 are executed simultaneously. One of the outputs of the closed-loop healthy model is an estimated healthy thermostat opening $\hat{u}_t$ and one of the outputs of the closed-loop faulty model is an estimated faulty thermostat opening $\hat{u}_f$. These two values are compared at a block 76, which leads to a determination of a detected leak, as indicated at block 78. In this, the thermostat is considered to be leaking if the actual thermostat position is different than expected, based on engine coolant temperatures. In some instances, the thermostat may be considered to be leaking if the thermostat is stuck at any particular position, whether fully open, fully closed or somewhere in between, regardless of engine coolant temperatures.

The Extended Kalman Filter (EKF) is a non-linear estimator of the internal dynamical states for a state-space system that is affected by additive noise. The internal model may be augmented with noise, as indicated below:

$$T_{c,EngOut}(k+1) =$$
$$\left(1+\frac{1}{C_1}\dot{m}_{c,eng}(k)c_{p,c}-\frac{1}{C_1}k_{A,c}\right)T_{c,EngOut}(k)+\left(\frac{1}{C_1}c_{p,c}T_{c,RadOut}(k)\right)\dot{m}_{c,Rad}(k)+$$
$$\frac{1}{C_1}\dot{Q}_{Comb}(k)-\frac{1}{C_1}c_{p,c}\dot{m}_{c,m}(k)T_{c,m}(k)+\frac{1}{C_1}k_{A,c}T_{amb}(k)+w_{T,k}$$
$$u_t(k)=\max\{f_{t1}(T_{sat}(k)),\min(f_{t1}(T_{sat}(k)),u_t(k-1))\}+w_{u,k}$$

In this, $w_k$ is the process noise with a covariance $E[w_k w_k^T]=Q$ and $v_k$ is the measurement noise with a covariance $E[w_k w_k^T]=R$.

The closed-loop model of a healthy system includes measured coolant temperature $T_{c,EngOut}$ with the Kalman gains $L_T$ and $L_u$, and is described by the following:

$$\hat{T}_{c,EngOut}(k+1) = \left(1 + \frac{1}{C_1}\dot{m}_{c,eng}(k)c_{p,c} - \frac{1}{C_1}k_{A,c}\right)\hat{T}_{c,EngOut}(k) +$$

$$\left(\frac{1}{C_1}c_{p,c}T_{c,RadOut}(k)\right)\dot{m}_{c,Rad}(k) + \frac{1}{C_1}\dot{Q}_{Comb}(k) - \frac{1}{C_1}c_{p,c}\dot{m}_{c,m}(k)T_{c,m}(k) +$$

$$\frac{1}{C_1}k_{A,c}T_{amb}(k) + L_T(T_{c,EngOut}(k) - \hat{T}_{c,EngOut}(k))$$

$$\hat{u}_t(k) =$$

$$\max\{f_{t1}(T_{sat}(k)), \min(f_{t1}(T_{sat}(k)), \hat{u}_t(k-1))\} + L_u(T_{c,EngOut}(k) - \hat{T}_{c,EngOut}(k))$$

The output of EKF (Extended Kalman Filter) is an estimated coolant temperature $\hat{T}_{c,EngOut}$ and estimated thermostat position $\hat{u}_t$. It will be appreciated that estimated radiator flow may be determined from a flow model of engine coolant through the radiator 16 that depends on the estimated thermostat opening $\hat{u}_t$ and a pump speed $N_{pump}$. The estimated radiator flow may be indicated as $\dot{m}_{c,rad}(\hat{u}_t, N_{pump})$.

The closed-loop model of a faulty system includes measured coolant temperature $T_{c,EngOut}$ with the Kalman gains $L_T$ and $L_u$ and the faulty thermostat position $\hat{u}_f$, and is described by the following:

$$\hat{T}_{c,EngOut}(k+1) = \left(1 + \frac{1}{C_1}\dot{m}_{c,eng}(k)c_{p,c} - \frac{1}{C_1}k_{A,c}\right)\hat{T}_{c,EngOut}(k) +$$

$$\left(\frac{1}{C_1}c_{p,c}T_{c,RadOut}(k)\right)\dot{m}_{c,Rad}(k) + \frac{1}{C_1}\dot{Q}_{Comb}(k) - \frac{1}{C_1}c_{p,c}\dot{m}_{c,m}(k)T_{c,m}(k) +$$

$$\frac{1}{C_1}k_{A,c}T_{amb}(k) + L_T(T_{c,EngOut}(k) - \hat{T}_{c,EngOut}(k))$$

$$\hat{u}_f(k) = \hat{u}_f(k) + L_u(T_{c,EngOut}(k) - \hat{T}_{c,EngOut}(k)).$$

The output of EKF (Extended Kalman Filter) is an estimated coolant temperature $\hat{T}_{c,EngOut}$ and estimated thermostat position $\hat{u}_f$ in a fault case. Fault case is considered when the thermostat model does not follow the heating and cooling curves at nominal characteristics. It will be appreciated that estimated radiator flow may be determined from a flow model of engine coolant through the radiator 16 that depends on the estimated thermostat position $\hat{u}_f$ and a pump speed $N_{pump}$. The estimated radiator flow may be indicated as $\dot{m}_{c,rad}(\hat{u}_f, N_{pump})$.

Figure 6:
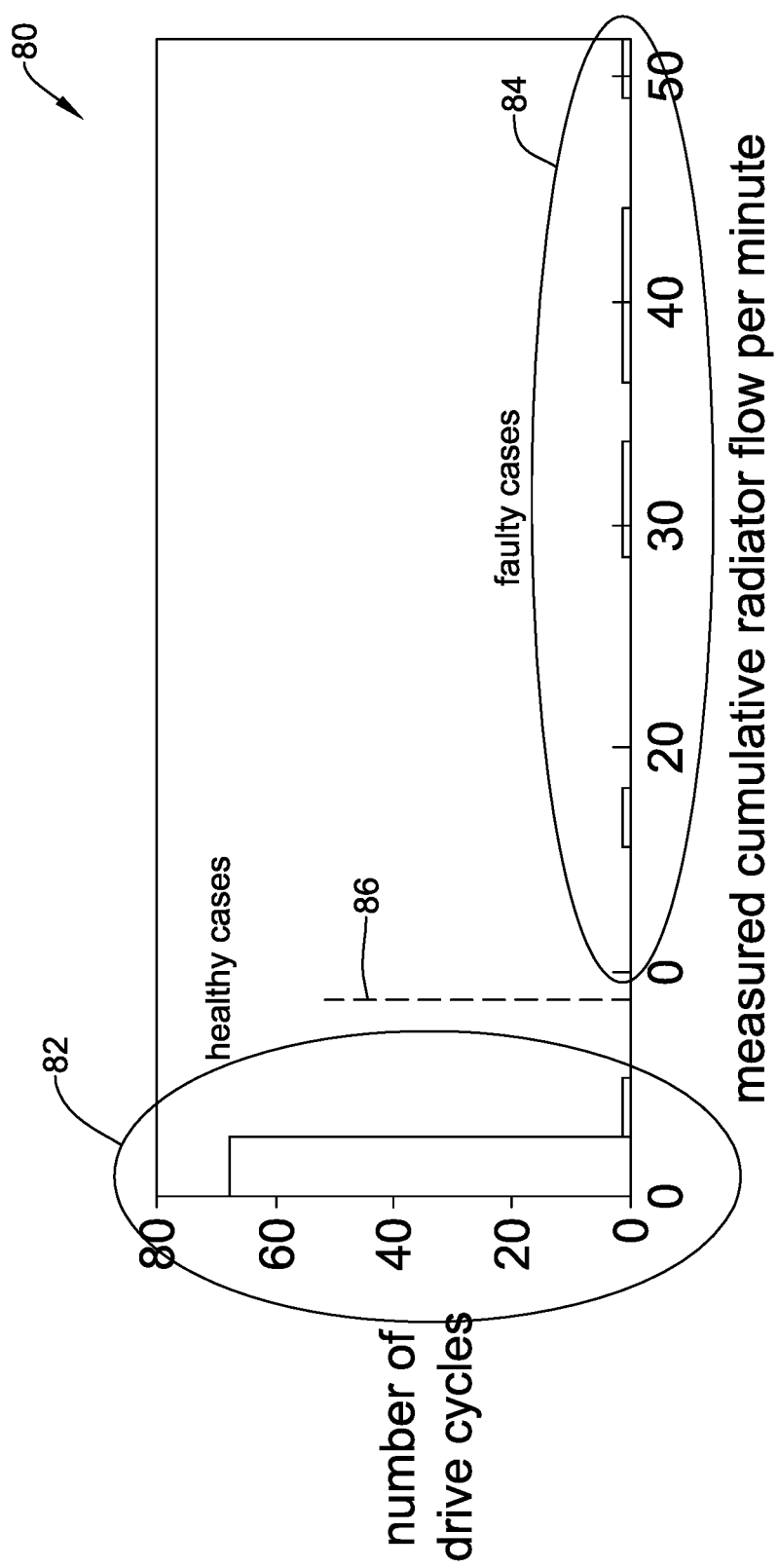
FIG. 6 is a graphical representation of measured data.

FIG. 6 is a graphical representation 80 showing an example of measured data. In the graphical representation 80, the vertical axis denotes number of drive cycles and the horizontal axis denotes the measured cumulative radiator flow per minute. A number of healthy cases are indicated within a healthy case ellipse 82 and a number of faulty cases are indicated within a faulty case ellipse 84. It can be seen that a separation threshold 86 is defined therebetween.

Figure 7:
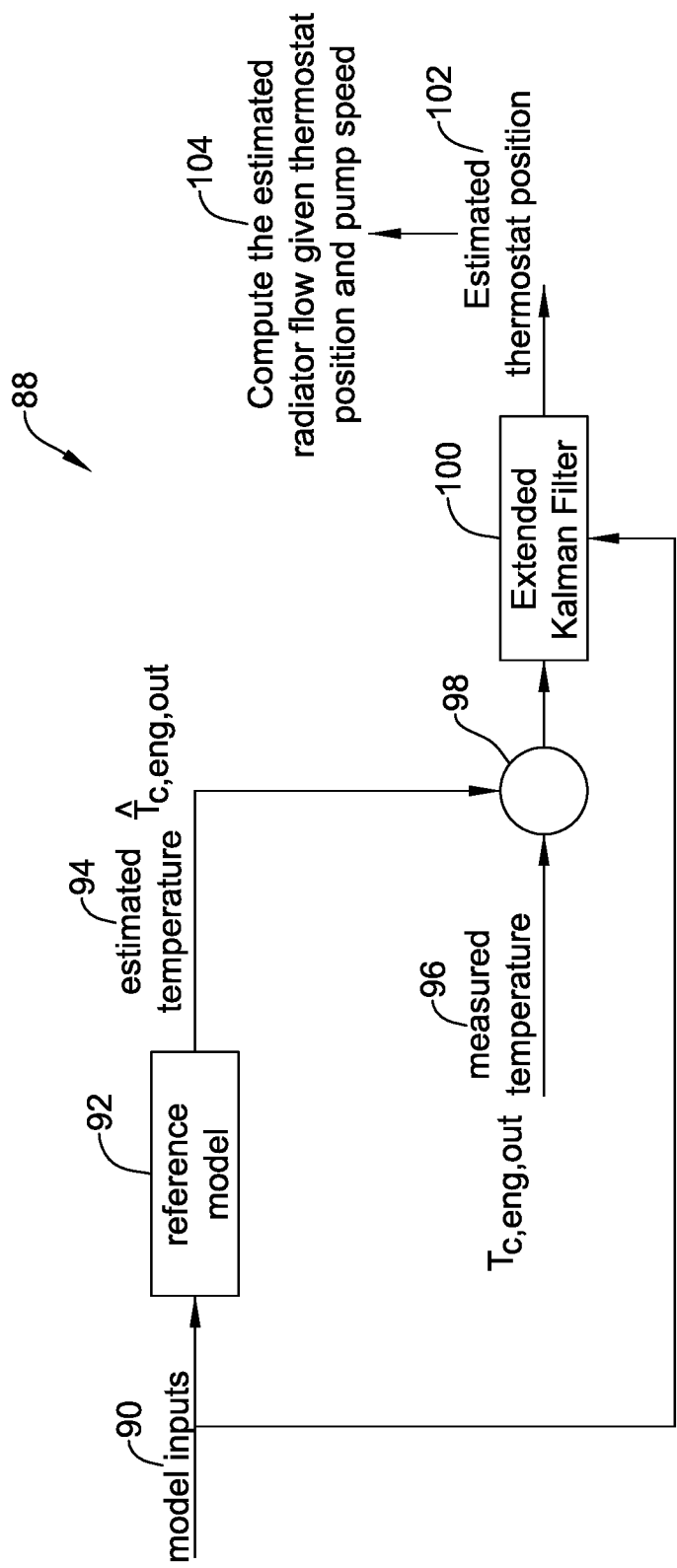
FIG. 7 is a schematic view of a particular model for predicting a thermostat fault.

FIG. 7 is a schematic block diagram of a model 88 that may be used to estimate an unmeasured radiator flow via an Extended Kalman Filtering approach. Model inputs 90 are fed to a reference model 92. An output of the reference model 92 is an estimated temperature 94. The estimated temperature 94 and a measured temperature 96 from an engine coolant temperature sensor are fed to a summation point 98, and then to an EKF (Extended Kalman Filter) 100. An estimated thermostat position is outputted from the EKF 100. Given the estimated thermostat position and pump speed, the estimated radiator flow can be determined.

Figure 8:
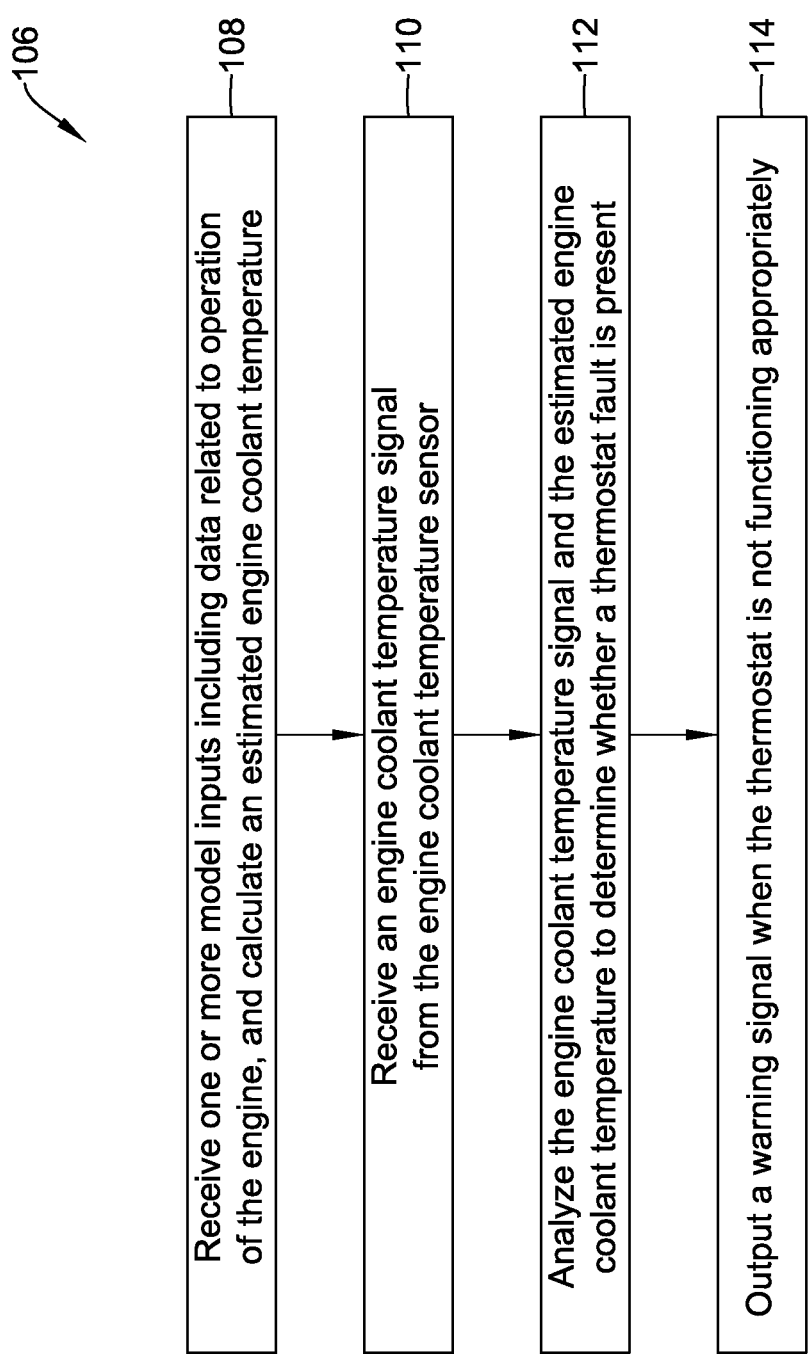
FIG. 8 is a flow diagram showing steps that may be carried out by a cooling system controller.
Figure 9:
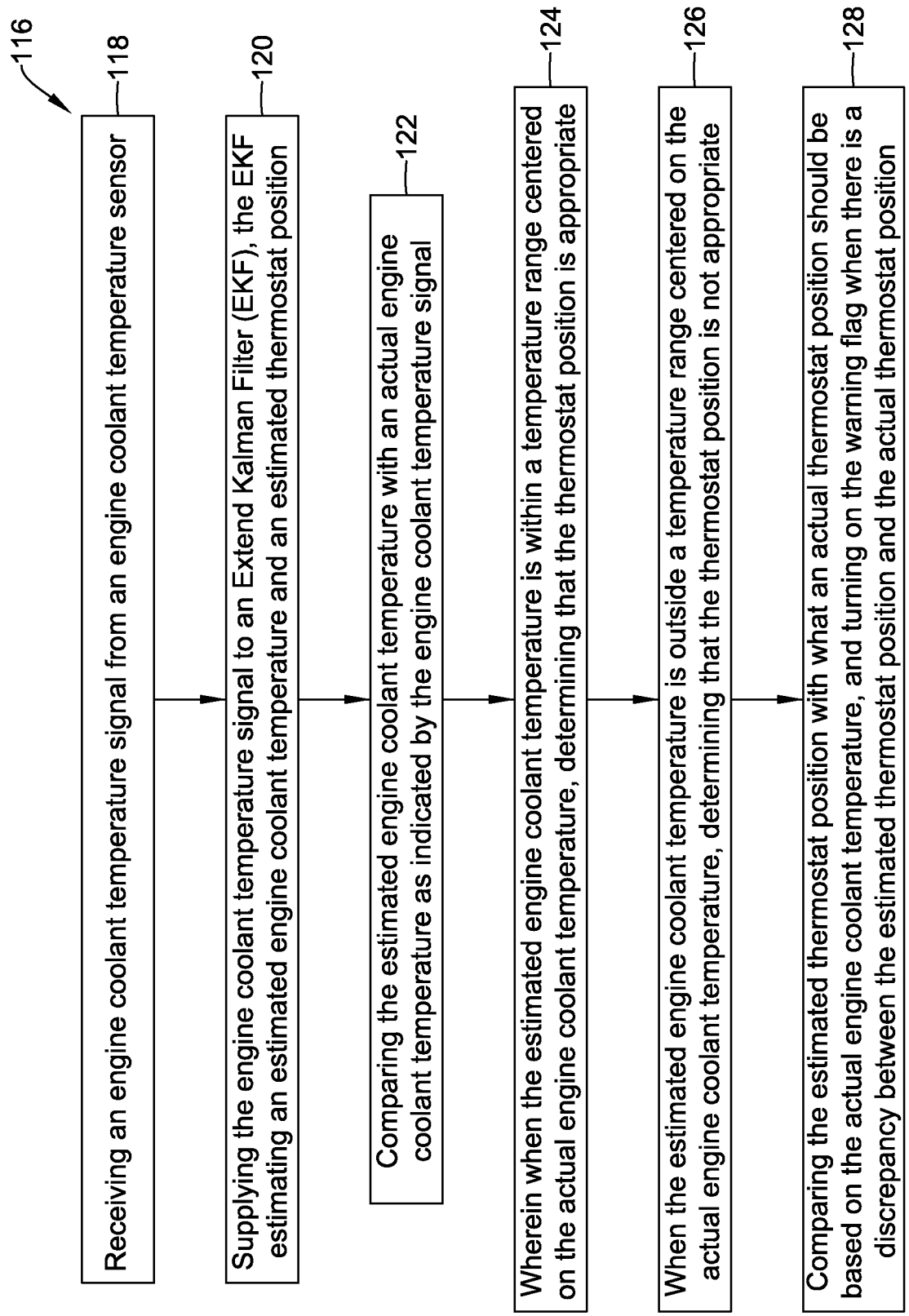
FIG. 9 is a flow diagram showing a method of monitoring performance of a thermostat.

FIG. 8 is a flow diagram showing an illustrative series 106 of steps that the controller 34 or an engine management system including the functionality of the controller 34 is configured to carry out. The controller 34 may be configured to receive one or more model inputs including data related to operation of the engine, and calculate an estimated engine coolant temperature, as indicated at block 108. The one or more model inputs may include, for example, a mass flow rate of coolant through the engine. The mass flow rate of coolant through the engine may be estimated using a rotational speed of a coolant pump circulating coolant through the engine and an estimated thermostat position.

The controller 34 may be configured to receive an engine coolant temperature signal from the engine coolant temperature sensor, as indicated at block 110. The controller 34 may be configured to analyze the engine coolant temperature signal and the estimated engine coolant temperature to determine whether a thermostat fault is present, as indicated at block 112. The controller 34 may be configured to determine that a thermostat fault is present when the estimated engine coolant temperature varies by more than 10 degrees C., or perhaps 20 degrees C., from an actual engine coolant temperature as indicated by the engine coolant temperature signal. The controller 34 may be configured to issue a warning signal responsive to the presence of the thermostat fault, as indicated at block 114. In some cases, the controller 34 may also be configured to use a reference model and the one or more model inputs to calculate the estimated engine coolant temperature.

FIG. 8 is a flow diagram showing an illustrative method 116 of monitoring performance of a thermostat within an engine cooling system, the engine cooling thermostat including a radiator and a coolant pump circulating coolant, the thermostat controlling flow of coolant through the radiator. The method includes receiving an engine coolant temperature signal from an engine coolant temperature sensor, as indicated at block 118. The engine coolant temperature signal is supplied to an Extended Kalman Filter (EKF), the EKF estimating an estimated engine coolant temperature and an estimated thermostat position, as indicated at block 120. The estimated engine coolant temperature is compared with an actual engine coolant temperature as indicated by the engine coolant temperature signal, as indicated at block 122.

When the estimated engine coolant temperature is within a temperature range centered on the actual engine coolant temperature, a determination may be made that the thermostat position is appropriate, as indicated at block 124. When the estimated engine coolant temperature is outside a temperature range centered on the actual engine coolant temperature, a determination may be made that the thermostat position is not appropriate, as indicated at block 126. In some cases, the method 116 may further include comparing the estimated thermostat position with what an actual thermostat position should be based on the actual engine coolant temperature, and turning on the warning flag when there is a discrepancy between the estimated thermostat position and the actual thermostat position, as indicated at block 128.

In some instances, when the estimated engine coolant temperature is below the temperature range centered on the actual engine coolant temperature, a determination may be made that the thermostat is stuck open and a warning flag is turned on. In some instances, when the estimated engine coolant temperature is above the temperature range centered on the actual engine coolant temperature, a determination may be made that the thermostat is stuck closed and a warning flag is turned on.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. An engine management system configured to control operation of an engine, the engine including a cooling system having a radiator, a cooling fan and a thermostat that controls flow of engine coolant to the radiator, the thermostat adjustable between a fully closed position and a fully open position, the engine management system comprising:
   an engine coolant temperature sensor arranged upstream of the thermostat; and
   a controller operably coupled with the engine coolant temperature sensor, the controller configured to:
   receive one or more model inputs including data related to operation of the engine, and calculate an estimated engine coolant temperature;
   receive an engine coolant temperature signal from the engine coolant temperature sensor;
   analyze the engine coolant temperature signal and the estimated engine coolant temperature to determine whether a thermostat fault is present; and
   responsive to presence of the thermostat fault, issue a warning signal;
   wherein the controller is configured to calculate the estimated engine coolant temperature from a model of heat transfer to the engine coolant in the engine and heat transfer from the engine coolant in the radiator.

2. The engine management system of claim 1, wherein the controller is configured to determine that a thermostat fault is present when the estimated engine coolant temperature varies by more than 10 degrees C. from an actual engine coolant temperature as indicated by the engine coolant temperature signal.

3. The engine management system of claim 1, wherein the controller is configured to determine that a thermostat fault is present when the estimated engine coolant temperature varies by more than 20 degrees C. from an actual engine coolant temperature as indicated by the engine coolant temperature signal.

4. The engine management system of claim 1, wherein the one or more model inputs include a mass flow rate of coolant through the engine.

5. The method of claim 1, wherein the controller is configured to calculate the estimated engine coolant temperature from a model of heat transfer to the engine coolant in the engine and heat transfer from the coolant in the radiator by estimating mass flow of coolant through the radiator and estimating mass flow of coolant through the engine, using thermostat position.

6. An engine management system configured to control operation of an engine, the engine including a cooling system having a radiator, a cooling fan and a thermostat that controls flow of engine coolant to the radiator, the thermostat adjustable between a fully closed position and a fully open position, the engine management system comprising:
   an engine coolant temperature sensor arranged upstream of the thermostat; and
   a controller operably coupled with the engine coolant temperature sensor, the controller configured to:
   receive one or more model inputs including data related to operation of the engine, and calculate an estimated engine coolant temperature;
   receive an engine coolant temperature signal from the engine coolant temperature sensor;
   analyze the engine coolant temperature signal and the estimated engine coolant temperature to determine whether a thermostat fault is present; and
   responsive to presence of the thermostat fault, issue a warning signal;
   wherein the one or more model inputs include a mass flow rate of coolant through the engine; and
   wherein the mass flow rate of coolant through the engine is estimated using a rotational speed of a coolant pump circulating coolant through the engine and an estimated thermostat position.

7. The engine management system of claim 6, wherein the controller is further configured to calculate the estimated engine coolant temperature using a reference model and the one or more model inputs.

8. A method of monitoring performance of a thermostat within an engine, the engine including a cooling system having a radiator, a cooling fan, a thermostat that controls flow of engine coolant to the radiator, an engine coolant temperature sensor arranged upstream of the thermostat, and a controller operably coupled with the engine coolant temperature sensor, the method comprising:
- the controller receiving one or more model inputs including data related to operation of the engine,
- the controller calculating an estimated engine coolant temperature from a model of heat transfer to the engine coolant in the engine and heat transfer from the engine coolant in the radiator;
- the controller receiving an engine coolant temperature signal from the engine coolant temperature sensor;
- the controller analyzing the engine coolant temperature signal and the estimated engine coolant temperature to determine whether a thermostat fault is present; and
- the controller finding presence of the thermostat fault, and in response thereto, issuing a warning signal.

9. The method of claim 8 wherein the step of the controller finding presence of the thermostat fault includes determining that the estimated engine coolant temperature varies by more than 10 degrees C. from an actual engine coolant temperature as indicated by the engine coolant temperature signal.

10. The method of claim 8 wherein the step of the controller finding presence of the thermostat fault includes determining that the estimated engine coolant temperature varies by more than 20 degrees C. from an actual engine coolant temperature as indicated by the engine coolant temperature signal.

11. The method of claim 8 wherein the one or more model inputs include a mass flow rate of coolant through the engine.

12. The method of claim 11, further comprising the controller estimating the mass flow rate of coolant through the engine using a rotational speed of a coolant pump circulating coolant through the engine, and an estimated position of the thermostat, and using the estimated mass flow rate of coolant through the engine in the model of heat transfer.

13. The method of claim 8, wherein the controller calculating an estimated engine coolant temperature from a model of heat transfer to the engine coolant in the engine and heat transfer from the coolant in the radiator includes the controller estimating mass flow of coolant through the radiator and estimating mass flow of coolant through the engine, using thermostat position.

* * * * *